(12) United States Patent
Jeffryes et al.

(10) Patent No.: US 10,409,300 B2
(45) Date of Patent: Sep. 10, 2019

(54) CHANGING SET POINTS IN A RESONANT SYSTEM

(71) Applicant: SCHLUMBERGER TECHNOLOGY CORPORATION, Sugar Land, TX (US)

(72) Inventors: Benjamin Peter Jeffryes, Cambridge (GB); John Cook, Cambridge (GB); Steven Gahlings, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 618 days.

(21) Appl. No.: 14/899,569

(22) PCT Filed: Jun. 26, 2014

(86) PCT No.: PCT/IB2014/062625
§ 371 (c)(1),
(2) Date: Dec. 18, 2015

(87) PCT Pub. No.: WO2014/207695
PCT Pub. Date: Dec. 31, 2014

(65) Prior Publication Data
US 2016/0139615 A1 May 19, 2016

Related U.S. Application Data

(60) Provisional application No. 61/840,193, filed on Jun. 27, 2013.

(51) Int. Cl.
*E21B 44/00* (2006.01)
*G05D 19/02* (2006.01)
(Continued)

(52) U.S. Cl.
CPC ........... *G05D 19/02* (2013.01); *E21B 43/128* (2013.01); *E21B 44/00* (2013.01); *E21B 47/00* (2013.01);
(Continued)

(58) Field of Classification Search
CPC ......... G05D 19/02; E21B 44/00; E21B 44/02; E21B 47/00; E21B 41/0092;
(Continued)

(56) References Cited

U.S. PATENT DOCUMENTS 2,810,546 A * 10/1957 Eaton ..................... E21B 47/16
346/7
2,815,928 A * 12/1957 Bodine, Jr. ............... E21B 6/00
175/323
(Continued)

FOREIGN PATENT DOCUMENTS

| EP | 0550254 A2 | 7/1993 |
|---|---|---|
| WO | 2011017627 A1 | 2/2011 |
| WO | 2013057247 A2 | 4/2013 |

*Primary Examiner* — Robert G Bachner
(74) *Attorney, Agent, or Firm* — Rachel E. Greene

(57) ABSTRACT

A method for changing a set point of a system where period of a dominant resonance of the system is determined, a change profile for the set point change is processed; a time period for the set point change based on the period of the dominant resonance in order to minimize excitation of the dominant resonance is also processed; and the set point change is actioned according to the processed change profile and the time period.

15 Claims, 7 Drawing Sheets

(51) Int. Cl.
    *E21B 47/00*   (2012.01)
    *E21B 43/12*   (2006.01)
    *G05B 15/02*   (2006.01)

(52) U.S. Cl.
    CPC .......... *E21B 47/0006* (2013.01); *G05B 15/02* (2013.01)

(58) Field of Classification Search
    CPC .... E21B 44/005; E21B 44/04; E21B 47/0006; E21B 21/08; E21B 3/00; E21B 45/00; E21B 47/04; E21B 47/06; E21B 47/10; E21B 7/068; E21B 7/24; E21B 10/08; E21B 10/18; E21B 19/08; E21B 2049/085; E21B 21/00; E21B 21/06; E21B 31/005; E21B 41/00; E21B 41/0085; E21B 43/126; E21B 43/128; E21B 47/0007; E21B 47/101; E21B 47/12; E21B 47/122; E21B 47/16; E21B 47/18; E21B 49/003; E21B 49/08; E21B 4/20; E21B 6/00; E21B 7/06; E21B 7/10; E21B 7/28; G05B 15/02; G05B 19/02; G05B 13/048; G05B 2219/24075; G05B 2219/2616; G05B 23/0243; G05B 13/042; G05B 19/05; G05B 2219/13095; G05B 13/041; G05B 19/402; G05B 2219/45129
    See application file for complete search history.

(56) References Cited

U.S. PATENT DOCUMENTS

| | | | | |
|---|---|---|---|---|
| 3,724,558 A * | 4/1973 | Rundell | ................... | E21B 44/00 137/49 |
| 4,071,097 A * | 1/1978 | Fulop | ....................... | E21B 7/24 175/340 |
| 4,574,888 A * | 3/1986 | Vogen | .................. | E21B 31/005 166/177.1 |
| 4,875,530 A * | 10/1989 | Frink | ...................... | E21B 19/08 175/27 |
| 5,507,353 A * | 4/1996 | Pavone | ................. | E21B 44/005 175/26 |
| 5,842,149 A * | 11/1998 | Harrell | .................... | E21B 44/00 702/9 |
| 6,021,377 A * | 2/2000 | Dubinsky | ............... | E21B 7/068 702/9 |
| 6,227,044 B1 * | 5/2001 | Jarvis | ..................... | E21B 44/00 166/250.1 |
| 6,912,904 B2 | 7/2005 | Storm et al. | | |
| 7,140,452 B2 | 11/2006 | Hutchinson | | |
| 8,136,610 B2 | 3/2012 | Jeffryes | | |
| 8,353,368 B2 * | 1/2013 | Wiercigroch | ............ | E21B 7/24 175/327 |
| 8,977,523 B2 * | 3/2015 | Ertas | ...................... | E21B 44/00 703/2 |
| 9,696,198 B2 * | 7/2017 | Turner | .................... | G01H 1/003 |
| 2003/0234119 A1 * | 12/2003 | Ray | ......................... | E21B 44/02 175/27 |
| 2004/0245017 A1 | 12/2004 | Chen et al. | | |
| 2005/0071120 A1 * | 3/2005 | Hutchinson | ............. | E21B 44/00 702/150 |
| 2007/0256861 A1 * | 11/2007 | Hulick | ..................... | E21B 4/20 175/26 |
| 2011/0153217 A1 | 6/2011 | Rodney | | |
| 2011/0186353 A1 * | 8/2011 | Turner | ................. | G05B 13/048 175/40 |
| 2011/0232966 A1 * | 9/2011 | Kyllingstad | ............ | E21B 44/00 175/24 |
| 2011/0245980 A1 * | 10/2011 | Nessjoen | ................ | E21B 44/00 700/280 |
| 2012/0013335 A1 * | 1/2012 | Saasen | .................... | G01N 24/08 324/303 |
| 2012/0217067 A1 * | 8/2012 | Mebane | ................ | E21B 44/02 175/57 |
| 2013/0092438 A1 | 4/2013 | Turner et al. | | |
| 2014/0118157 A1 * | 5/2014 | Jamison | .................. | E21B 47/12 340/854.6 |
| 2014/0265580 A1 * | 9/2014 | Cooley | ............... | E21B 41/0085 307/47 |
| 2014/0360779 A1 * | 12/2014 | Kyllingstad | ............ | E21B 44/00 175/24 |
| 2015/0083492 A1 * | 3/2015 | Wassell | .................... | E21B 44/00 175/24 |
| 2015/0083493 A1 * | 3/2015 | Wassell | ................. | E21B 49/003 175/40 |
| 2015/0112488 A1 * | 4/2015 | Hoehn | .................... | E21B 44/00 700/275 |
| 2015/0211350 A1 * | 7/2015 | Norman | ................ | G05B 15/02 700/275 |
| 2016/0024905 A1 * | 1/2016 | Johnson | .................. | E21B 44/00 700/283 |
| 2016/0139615 A1 * | 5/2016 | Jeffryes | ................. | E21B 43/128 700/280 |
| 2016/0230482 A1 * | 8/2016 | Rapoport | ................ | E21B 21/06 |
| 2016/0230484 A1 | 8/2016 | Johnson et al. | | |
| 2016/0273332 A1 * | 9/2016 | Dwars | ..................... | E21B 44/00 |
| 2017/0101861 A1 * | 4/2017 | Kyllingstad | ............ | E21B 44/00 |

\* cited by examiner

CHANGING SET POINTS IN A RESONANT SYSTEM

BACKGROUND

Embodiments of the present invention relate to changing levels or set points in a resonant system, such as a system in a borehole.

In the oilfield/hydrocarbon industry, boreholes/wellbores are drilled into subterranean hydrocarbon reservoirs so that the hydrocarbons can be recovered. In general, a borehole is drilled through an earth formation into a hydrocarbon reservoir and the hydrocarbons are produced through the wellbore. Typically, earth formations are explored for hydrocarbons, the borehole is drilled and then completed—which may comprise lining the borehole with cement and/or casing—and then the hydrocarbons are produced from the borehole, which may require pumps to pump the hydrocarbons up the borehole. Wellbore tools may be used in the borehole, normally suspended on a wireline or attached to a drillstring/coiled tubing, to carry out operations in the borehole to provide for the construction and completion of the wellbore and/or the production of the hydrocarbons.

The drilling of a borehole is typically carried out using a steel pipe known as a drillstring with a drill bit on the lowermost end; the drill bit is normally attached to or is a part of a bottomhole assembly attached to the lower end of the drillstring. In a drilling procedure, the entire drillstring may be rotated using an over-ground drilling motor, or the drill bit may be rotated independently of the drillstring using a fluid powered/electric motor or motors mounted in the drillstring just above the drill bit. As drilling progresses, a flow of drilling fluid is used to carry the debris created by the drilling process out of the wellbore. During the drilling procedure, the drilling fluid is pumped through an inlet line down the drillstring, passes through holes in the drill bit, and returns to the surface via an annular space between the outer diameter of the drillstring and the borehole (the annular space is generally referred to as the annulus).

In some drilling systems, as discussed in more detail below, the pressure in the borehole being drilled is controlled in order to optimize the drilling procedure and/or minimize adverse effects affecting the drilling procedure. The drilling system comprises a large dynamic system, a long tube of drill pipe or coiled tubing that is suspended and/or moved within a borehole and a borehole that is full of a fluid that may be flowing through the wellbore at the same time the drill pipe or coiled tubing is in motion. As would be expected, the drilling systems, being large dynamic systems, have resonant properties associated with them.

FIG. 1 illustrates a drilling system for operation at a well-site to drill a borehole through an earth formation. The well-site can be located onshore or offshore. In this system, a borehole 311 is formed in subsurface formations by rotary drilling in a manner that is well known. The invention can also use be used in directional drilling systems, pilot hole drilling systems, casing drilling systems and/or the like.

A drillstring 312 is suspended within the borehole 311 and has a bottomhole assembly 300, which includes a drill bit 305 at its lower end. The surface system includes a platform and derrick assembly 310 positioned over the borehole 311, the assembly 310 including a rotary table 316, kelly 317, hook 318 and rotary swivel 319. The drillstring 312 can be rotated by the rotary table 316, energized by means not shown, which engages the kelly 317 at the upper end of the drillstring. The drillstring 312 is suspended from a hook 318, attached to a traveling block (also not shown), through the kelly 317 and the rotary swivel 319 which permits rotation of the drillstring relative to the hook. As shown in FIG. 1, a top drive system could alternatively be used to rotate the drillstring 312 in the borehole and, thus rotate the drill bit 305 against a face of the earth formation at the bottom of the borehole.

The surface system further includes drilling fluid or mud 326 stored in a pit 327 formed at the well site. A pump 329 delivers the drilling fluid 326 to the interior of the drillstring 312 via a port in the swivel 319, causing the drilling fluid to flow downwardly through the drillstring 312 as indicated by the directional arrow 308. The drilling fluid exits the drillstring 312 via ports in the drill bit 305, and then circulates upwardly through the annulus region between the outside of the drillstring and the wall of the borehole, as indicated by the directional arrows 309. In this well-known manner, the drilling fluid lubricates the drill bit 305 and carries formation cuttings up to the surface as it is returned to the pit 327 for recirculation.

The bottomhole assembly 300 of the illustrated system may include a logging-while-drilling (LWD) module 320, a measuring-while-drilling (MWD) module 330, a rotary-steerable system and motor, and drill bit 305.

The LWD module 320 may be housed in a special type of drill collar, as is known in the art, and can contain one or a plurality of known types of logging tools. It will also be understood that more than one LWD and/or MWD module can be employed, e.g. as represented at 320A. The LWD module may include capabilities for measuring, processing, and storing information, as well as for communicating with the surface equipment. In one embodiment, the LWD module may include a fluid sampling device.

The MWD module 330 may also be housed in a special type of drill collar, as is known in the art, and can contain one or more devices for measuring characteristics of the drillstring and drill bit. The MWD tool may further include an apparatus (not shown) for generating electrical power to the downhole system. This may typically include a mud turbine generator powered by the flow of the drilling fluid, it being understood that other power and/or battery systems may be employed. The MWD module may include one or more of the following types of measuring devices: a weight-on-bit measuring device, a torque measuring device, a vibration measuring device, a shock measuring device, a stick slip measuring device, a direction measuring device, a rotation speed measuring device, and an inclination measuring device.

Drilling an oil and/or gas well using the drilling system depicted in the figure may involve drilling a borehole of considerable length; boreholes are often up to several kilometers vertically and/or horizontally in length. As depicted, the drillstring comprises a drill bit at its lower end and lengths of drill pipe that are screwed/coupled together. A drive mechanism at the surface rotates the drill bit against a face of the earth formation to drill the borehole through the earth formation. The drilling mechanism may be a top drive, a rotary table or the like. In some drilling processes, such as directional drilling or the like, a downhole motor that may be powered by the drilling fluid circulating in the borehole or the like, may be used to drive the drill bit.

The drillstring undergoes complicated dynamic behaviour in the borehole during the drilling procedure, which complicated behaviour may include axial, lateral and torsional vibrations as well as frictional and vibrational interactions with the borehole. Simultaneous measurements of drilling rotation at the surface and at the bit have revealed that while the top of the drill string rotates with a constant angular velocity, the drill bit may rotate with varying angular velocities. In extreme cases, known as stick-slip, the drill bit or another portion of the drillstring may stop rotating in the borehole, as a result, the drill string continues to be twisted/rotated until the bit rotates again, after which it accelerates to an angular velocity that is much higher than the angular velocity of the top of the drillstring.

Stick-slip is a recognized problem in the drilling industry and may result in a reduced rate of penetration through the earth formation, bit wear, tool failures and the like. The sticking of the drill bit in the borehole may reduce drilling rates, result in torsional damage to the drillstring and the fast rotation of the drill bit, when it is unstuck, may cause damage to the drilling system.

Drilling fluid is a broad drilling term that may cover various different types of drilling fluids. The term "drilling fluid" may be used to describe any fluid or fluid mixture used during drilling and may cover such things as drilling mud, heavily weighted mixtures of oil or water with solid particles, air, nitrogen, misted fluids in air or nitrogen, foamed fluids with air or nitrogen, aerated or nitrified fluids and. In practice, the flow of drilling fluid through the drillstring may be used to cool the drill bit as well as to remove the cuttings from the bottom of the borehole.

In conventional overbalanced drilling, the density of the drilling fluid is selected so that it produces a pressure at the bottom of the borehole (the "bottom hole pressure" or "BHP"), which is high enough to counter-balance the pressure of fluids in the formation ("the formation pore pressure"). By counter-balancing the pore pressure, the BHP acts to prevent the inflow of fluids from the formations surrounding the borehole into the borehole. However, if the BHP falls below the formation pore pressure, formation fluids, such as gas, oil and/or water may enter the borehole and produce what is known in drilling as a kick. By contrast, if the BHP is high, the BHP may be higher than the fracture strength of the formation surrounding the borehole resulting in fracturing of the formation.

When the formation is fractured, the drilling fluid may enter the formation and be lost from the drilling process. This loss of drilling fluid from the drilling process may cause a reduction in BHP and as a consequence cause a kick as the BHP falls below the formation pore pressure. Loss of fluid to the formations as a result of fracturing is known as fluid loss or lost circulation and may be expensive, as a result of lost drilling fluid, and increase the time to drill the borehole. Kicks are also dangerous and the liquid and/or gas surge associated with the influx into the borehole requires handling at surface.

In order to overcome the problems of kicks and/or fracturing of the formation during drilling, a process known as managed pressure drilling ("MPD") has been developed. In managed pressure drilling various techniques are used to control/manage the BHP during the drilling process. In MPD, the flow of drilling fluid into and out of the borehole is controlled. This means that pumps that pump the fluid into the borehole and chokes that control the flow of fluid out of the borehole are controlled to control the BHP. Additionally, gas may be injected into the drilling fluid to reduce the drilling fluid density and thus reduce the BHP produced by the column of the drilling fluid in the drilling annulus. In general, until recently, MPD techniques have been fairly crude relying on manual control of the pumps and choke.

As can be seen from the foregoing, a drilling system for drilling a borehole through an earth formation is a complex system in which, typically, a drillstring with a bottomhole assembly at its lower end is suspended in a borehole and a drill bit, which is a part of the borehole, is rotated against the earth formation to extend the borehole. The drillstring may be rotated in the borehole to produce a rotation of the drill bit. Another option is for a downhole motor to be used to rotate the drill bit. In some systems, the drillstring comprises stands of metal pipe that are added to the drillstring as the drill bit extends the borehole. In other systems, the drillstring comprises a coiled tube that is extended into the borehole as the drill bit extends the borehole. In the hydrocarbon industry, once the borehole has been drilled, pipe, often referred to as casing or a casing string, may be used to line the wellbore. Additionally, in the hydrocarbon industry, wellbore procedures may be carried out using a wireline on which tools/sensors are attached and the wireline is extended from a surface location down into the borehole so that the tools/sensors can be used along the wellbore.

As described above, there are many parameters that may be controlled to control the behaviour of the drilling system. For example, these parameters include the speed of rotation of the drill bit, the weight applied to the drill bit, the orientation of the drill bit, the properties of the drilling fluid pumped around the wellbore, the pressure/rate of pumping of the drilling fluid and/or the like. At the same time there are also many parameters associated with the drilling fluid they may be varied, such as the pump rate of the drilling fluid, an amount of choke applied to the drilling fluid, a density to the drilling fluid and/or the like. Additionally, wireline systems may extend into a borehole and tools, sensors and/or the like may be operated in the borehole while suspended on the wireline. Operational parameters can then be associated with the operation of such wireline tools and systems. Furthermore, pumps, such as electric submersible pumps ("ESPs") may be used in the borehole to pump drilling fluid into the borehole, to pump production fluids out of the borehole and/or the like. Changes to any of these parameters in a wellbore system may be made singly or in combination to control the drilling/wireline/wellbore/pumping process(es). Control of the parameters may be performed by a person, such as the driller, a processor and/or a person in combination with a processor.

The systems described above comprise dynamic system in which long lengths of pipe/wireline/tubing are extended from a surface location down a borehole and the pipe/wireline/tubing may be moved therein and/or fluids may be moved through the pipe/tubing and/or the borehole. Increasingly, parameters associated with a wellbore procedure, such as drilling/wireline procedures, pumping procedures and/or the like are sensed and used to provide feedback/input into the ongoing drilling/wireline/pumping procedure. In some procedures, closed loop automation provides for automatically carrying out a wellbore procedure using measurements of the state of the system being used and/or measurements of the effect being produced by operation of the system. Moreover, in the dynamic wellbore systems described above, any motors, pumps and/or other types of machinery that are activated/operated in the borehole, such as mud motors, electric submersible pumps and/or the like will undergo a change in state during their operation and will interact with the drillstring, tubing, wireline, borehole, the column of fluid in the borehole and/or the like, when a change of state occurs.

In systems in which a state of the wellbore system and or the effect of the wellbore system are sensed during a procedure and/or in autonomous and/or semi-autonomous wellbore systems, a state of the wellbore system can be changed based upon sensed/measured properties of the wellbore, the wellbore system, an effect/output of the wellbore system and/or the like. A change of state of the wellbore system may comprise a change in pumping rate of drilling fluid, an increase in rotation speed of the drillstring/coiled tubing in the borehole, an increase in motor speed of a downhole motor, a change in operation parameters of a wellbore tool, raising a drill bit/wellbore tool from a bottom of the borehole or from contacting an earth formation, increasing weight-on-bit and/or the like.

Conventionally, a change in state of the wellbore system is directed to be made as-soon-as-possible when needed based upon measured/sensed data in order to adapt the wellbore system to changes as the wellbore procedure progresses. Previously, it has been recognized that wellbore systems, because of their configuration, may be associated with resonant frequencies and, in changing a state of the wellbore system, these frequencies may be avoided or filtered from the change of state process.

As discussed above, wellbore systems, like many large dynamic systems, exhibit resonant behaviour. Merely by way of example, in the oilfield/hydrocarbon industry, a drillstring in rotation, changes of pressure and flow fluctuations in the borehole annulus are examples of large dynamic systems. Often the large dynamic systems are required to move between controlled set-points, for instance changing the rotation speed of the drillstring, changing the pressure-drop across a choke on the annulus and/or the like. Making changes in these resonant systems will often result in development of large amplitude oscillations in the system, which may take a long time to die down, thereby interfering with the wellbore procedure and/or causing damage to equipment in the borehole.

SUMMARY

In general terms, according to one embodiment the present invention, changes in the set-point of a wellbore system (i.e. changing the operating state of the wellbore system from one level to another, such as increasing the speed of rotation of a drillstring from one speed to another) may be made over a time-scale that is controlled by the dominant resonance of the system. In particular, the time-scale may be determined according to the period of the dominant resonance. It has been found that by controlling changes in set points in this way, the amplitude of resulting resonant oscillations in the system can be considerably reduced.

As a result, embodiments of the present invention may enable an automated or semi-automated system, where set-point changes are made over a time-scale controlled by the period of the dominant resonance of the system, whereby the automated/semi-automated system can produce a controlled wellbore system where oscillations of the system are controlled/mitigated, wellbore processes are more effectively controlled, and/or desired results are more efficiently achieved.

Accordingly, in a first aspect, one embodiment of the present invention provides a method for changing a set point of a system in a borehole by: determining the period of a dominant resonance of the system; processing a change profile for the set point change; determining a time period for the set point change based on the period of the dominant resonance in order to minimize excitation of the dominant resonance; and performing the set point change according to the change profile and the time period. In such an embodiment, resonance data for the system is transformed into control parameters that are used to control the operation of the system Further aspects of the present invention provide: a computer program comprising code which, when run on a computer, causes the computer to perform the method of the first aspect; a computer readable medium storing a computer program comprising code which, when run on a computer, causes the computer to perform the method of the first aspect; and a computer-based system programmed to perform the method of the first aspect.

For example, a control system can be provided for changing a set point of a borehole system, where the control system comprises a processor(s) configured to determine the period of a dominant resonance of the system; process a change profile for the set point change from the sensed properties; and determine a time period for the set point change based on the period of the dominant resonance in order to minimize excitation of the dominant resonance; and a controller configured to control the system to perform the set point change according to the change profile and the time period.

The system thus corresponds to the method of the first aspect. The processor may comprise a downhole processor, a surface processor or a combination of a downhole and a surface processor. The system may be an automated system. The system may further comprise one or more sensors to sense properties of the system and/or the borehole, the determination of the period of the dominant resonance of the system and/or the processing of the change profile being based on the sensed properties.

A further aspect of some embodiments of the present invention provides a rig (such as a drilling, exploration or production rig) or a tool (such as a wireline tool or an electro-submersible pump) that comprises the system of the previous aspect.

Optional features of the invention will now be set out. These are applicable singly or in any combination with any aspect of the invention.

The borehole system may be a drillstring. In this case, the dominant resonance can be for rotation of the drillstring., and the set point may then be the drillstring rotation speed. More particularly, there are many large-scale dynamic systems which during their operations are moved from one setting to another. For instance, during the drilling of a borehole, the drillstring rotation speed is regularly changed as the earth formation changes and/or other conditions change.

At the start of a drilling process, in a rotary drilling system using a top drive system, a rotation speed of the top of the drillstring is changed from zero to some non-zero value (normally a constant value). Large-scale dynamic systems often have one or more resonances at frequencies that are comparable to or longer than the time-scale taken or necessary for a change from one setting to another setting. Merely by way of example, a drillstring of length 750 meters may have a resonance with a period of roughly 1 second, and a 7500 meter length drillstring may have a resonance with a period of about 10 seconds. The dominant resonance for rotation for a drillstring driven at constant rotation speed typically has boundary conditions close to constant speed at the surface and free at the distal end, for which the resonant period for a constant cross-section drillstring would be one quarter wavelength. Thus, with an average wave-speed in drillpipe of around 3000 m/s, the period is four times the length of the pipe in meters divided by 3000. For a real drillstring with larger components at the bottom, the period is longer.

Typically, changes in rotation speed of drillstrings are made over periods between one and ten seconds. Similarly, lengths of drilling fluid in the borehole/annulus will have resonant frequencies associated with them and these may be comparable or longer than the time period required to change, for example, a flow rate of the drilling fluid in the borehole from a first rate to a second rate.

When the set point is the weight-on-bit, the dominant resonance can be for rotation of the drillstring and/or for axial wave speed in the drillstring. More particularly, for changes in the axial load (weight-on-bit) of a drillstring, although in some circumstances it may be advantageous to avoid exciting the fundamental axial resonance (which is typically close to a half wave-length resonance with a wave speed of approximated 5000 m/s), when drilling with a drill bit that generates significant torque, and especially a drag bit, such as a poly-crystalline diamond compact (PDC) bit, the fundamental resonance that is important is generally that of the rotary system, just as for changing rotation speed. This is because the linear change in weight will generate a linear change in torque at the bit, and that change in torque will excite the rotary system.

When the set point is the speed of pump(s) controlling flow of fluid into of the drillstring, the setting of choke(s) controlling flow of fluid out of the borehole, and/or gas injection into the fluid in the drillstring and/or in the annulus around the drillstring, the dominant resonance can be for compression waves in fluid inside the drillstring and/or in fluid in the annulus. More particularly, for resonances associated with the fluid inside the drillstring, the typical wave speed is close to the compressional wave speed in the fluid, which varies from around 1600 m/s for fully salt-saturated water, to less than 1000 m/s for a weighted oil-based fluid. The fundamental resonance may be between a half-wavelength for a large pressure drop at the bit, and a quarter wavelength for a small pressure drop at the bit, and the fundamental resonance may then be between twice and four times the drillstring length divided by the wave speed. For resonances associated with the fluid in the annulus, again the fundamental resonance may be between a quarter and a half wavelength, where a quarter corresponds to an open annulus, and a half is a closed choke. The wave speed for waves in the annulus is typically less than inside the drillstring, because of the effect of the compliant borehole wall, but may also be substantially reduced if gas is present in the annulus.

The borehole system may be a wireline/wireline system. For wireline resonances, the fundamental resonance may typically be close to a half-wavelength resonance, and the period may then be close to twice the length of the wireline, divided by axial wave speed in the wireline cable (which varies along the length with the wireline tension). Thus, when the set point is the speed of lowering or raising the wireline, the dominant resonance can be for axial wave speed in the wireline.

The borehole system may be an electro-submersible pump. For an electro-submersible pump (ESP), there are two resonant periods which may be important, one much longer than the other. The shorter of the two is the first rotational resonance of the shaft of the pump, which is a fixed-free resonance (fixed rotation at the motor end, free at the other end), which may be close to a quarter wavelength. Although these are rotational waves of the shaft, the extra mass-loading due to the pump stages means that the average speed of rotational waves may be much lower than the wave speed for the shaft alone. The wave speed can be readily calculated as the square root of the mean rotational moment per unit length, multiplied by the mean rotational compliance per unit. The longer period corresponds to fluid waves in the production tubing, and may be between a quarter and half wavelength resonance, with the wave speed of the produced fluids, which can be could be anywhere between a few hundred meters per second and 1600 meters per second, depending on the ratio of gas, oil and water, and the salinity of the water. Thus, when the set point is the ESP pump speed, the dominant resonance can be the rotational resonance of a shaft of the pump and/or for fluid waves in production tubing in the borehole.

Each change between settings of the wellbore system has a change profile, i.e. how the set-point gradient changes with time. For example, the change profile may be linear with the change in rotation being linearly increased between settings or the like. A set of times/time durations that are proportional to the period of the resonance of the drilling system/aspect of the drilling system is selected over which to make a set change. By selecting the set change time durations to be proportional to the period of resonance, excitation of the resonance (excitation of large resonant oscillations in the drilling system) by the set point change is minimized.

For instance, if the change profile is linear with time (constant gradient), i.e. ramping up the speed of rotation of the drilling system linearly from a low speed to a higher speed of rotation, the time over which to make the change, may be an integer multiple of the resonance period of the drilling system. If, however, the change profile time derivative follows a half-period of a sine-wave or the like, then the time period over which to make the change may be an integer-plus-a-half multiple of the resonance period of the drilling system. More generally, the time period may be a multiple of the period of the dominant resonance.

The change profile may be symmetric about the mid-time of the change. In such an embodiment, the change profile may have frequencies that it does not excite. The determination of the time period for the set point change can conveniently be performed by taking the Fourier transform of the time derivative of the change profile.

The period of the dominant resonance can be directly measured, for example by analysing an appropriate spectrum or time-series (e.g. in the case of a drillstring, a spectrum or time-series of drillstring torque or rotation speed measured either at surface or downhole), or it can be calculated using elastic wave appropriate theory (e.g. elastic wave theory in the case of a drillstring).

For many systems, such as the drillstring described above, the resonance period varies over time (in this case, because in the course of drilling the drillstring is extended, and the resonance period increases approximately proportionately). Furthermore, for devices that interact with the fluid column in the borehole, the resonant period for the fluid column in the borehole may vary over time as other operations change the properties of the fluid column, the length of the borehole and/or the like.

BRIEF DESCRIPTION OF THE DRAWINGS

Embodiments of the invention will now be described by way of example with reference to the accompanying drawings in which.

Figure 1:
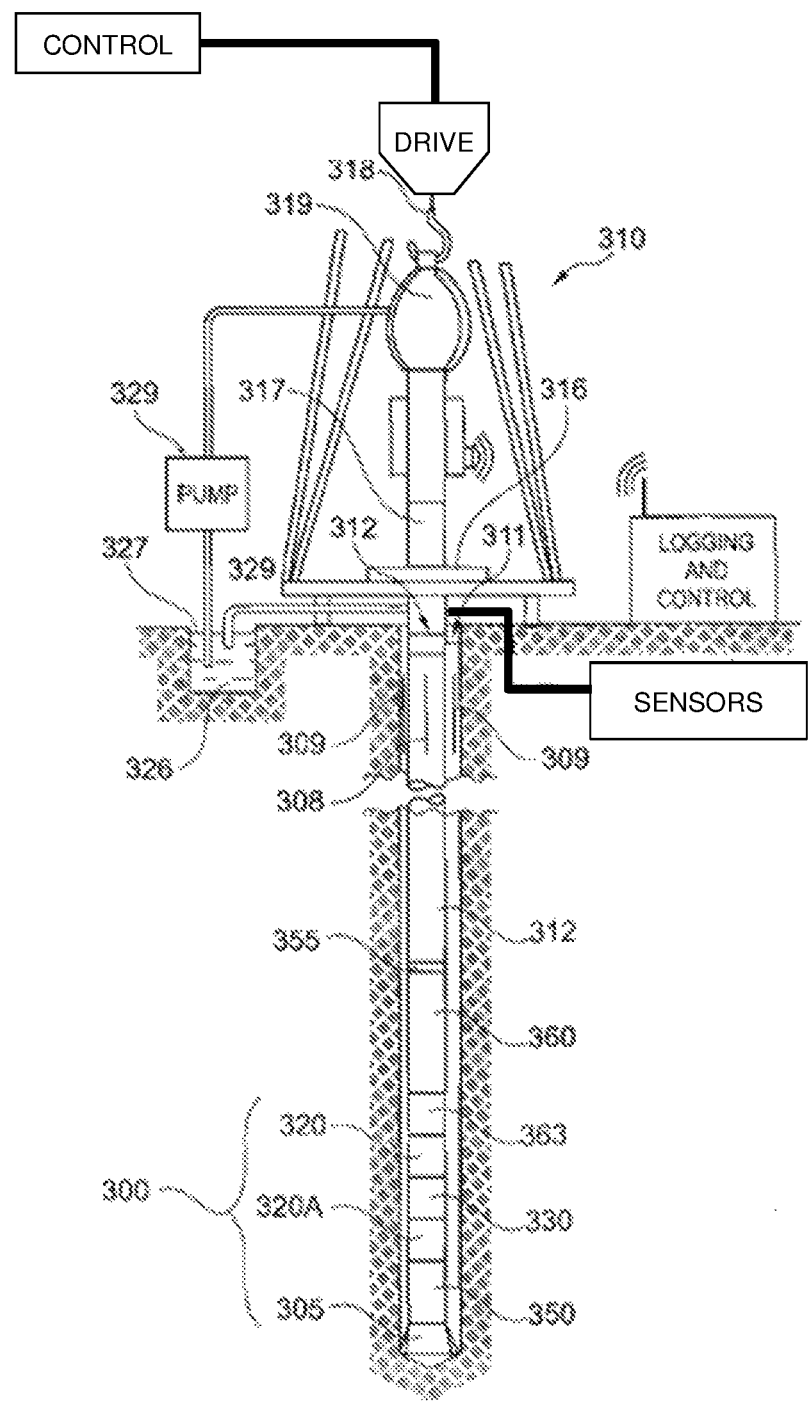
FIG. 1 illustrates a drilling system for operation at a well-site to drill a borehole through an earth formation.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well known methods, procedures, components, and systems have not been described in detail so as not to unnecessarily obscure features of the embodiments. In the following description, it should be understood that features of one embodiment may be used in combination with features from another embodiment where the features of the different embodiment are not incompatible.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step. The first object or step, and the second object or step, are both objects or steps, respectively, but they are not to be considered the same object or step.

The terminology used in the description of the disclosure herein is for the purpose of describing particular embodiments only and is not intended to be limiting of the subject matter. As used in this description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting", depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Figure 2A:
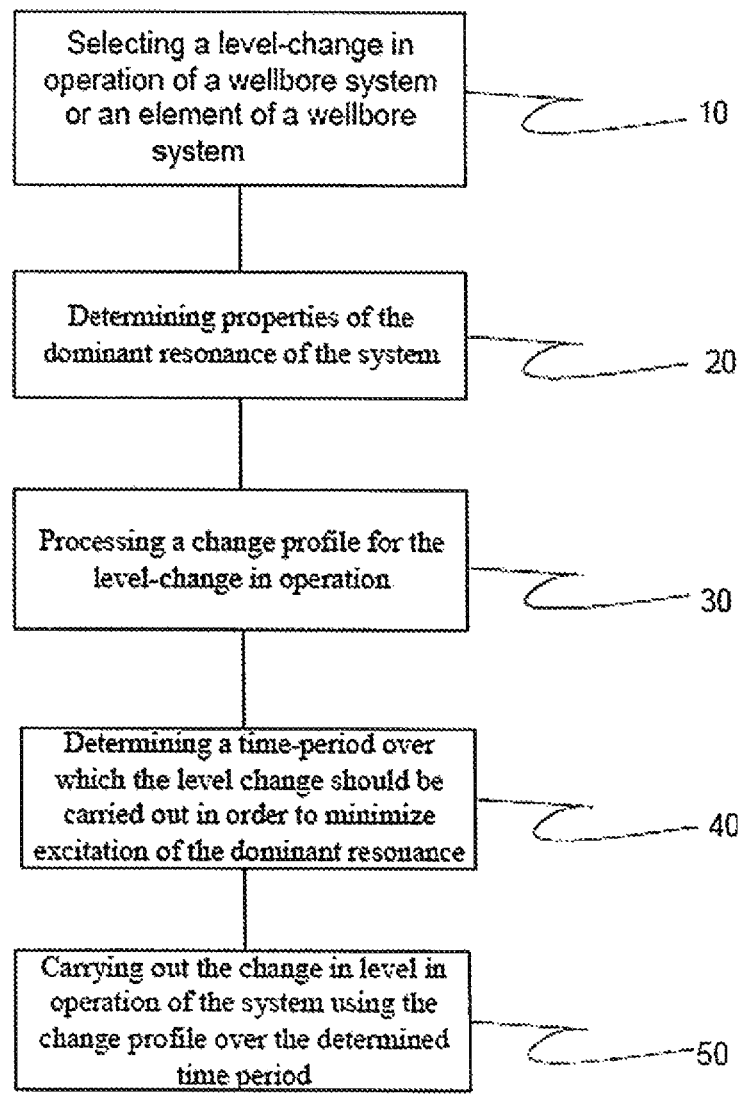
FIG. 2A is a flow-type illustration of a method for performing a level change.

FIG. 2A is a flow-type illustration of a method for performing a level change, i.e. set point change, for a wellbore system, in accordance with an embodiment of the present invention.

In step 10, a level change in the operation of an element of a wellbore system or an element of the wellbore system is selected. In particular, a wellbore system, such as a drilling system, may be being operated under one condition, for example a drillstring of the drilling system may be being rotated in a borehole at a first rotation speed, and a change to a different operating condition may be required/desired, i.e., it may be desired/necessary to change the drilling rotation speed. Similarly, in a wellbore production system, such as an artificial lift system it may be desired/necessary to start-up an ESP or change the pump rate of the ESP. Another possibility is that it may be desired to change an operating condition of an element of the wellbore system, e.g. where the wellbore system comprises a managed pressure drilling system, it may be necessary/desirable to change the flow rate of the drilling fluid in the borehole, change the choke aperture applied to drilling fluids flowing out of the borehole and/or the like.

In step 20, a dominant resonance of the wellbore system is determined. For example, resonant frequencies for a length of drillstring in a borehole may be determined based upon the operating parameters of the drillstring. Similarly, resonant frequencies associated with a column of drilling fluid flowing around/through a borehole may be determined based upon parameters of the fluid and/or systems operating in the wellbore in the flowing fluid. Quite often, the dominant resonance of a wellbore system may be a combination of the length of the system and the properties of the borehole and/or the fluids in the borehole.

In other examples, resonance frequencies associated with operation of an ESP may be determined from operation characteristics of the ESP and conditions existing in the wellbore. In MPD, the length of the wellbore, the pressure in the wellbore, the drilling parameters and/or the like may be used to determine resonant frequencies associated with operation of the MPD system. The dominant resonance of the wellbore system or an element of the wellbore system can be processed to determine a period of the dominant resonance of the system. This processing of the resonance period may be performed by calculation, modelling, measurement, comparison with previous operations and/or the like. A database/library of resonance occurrences for different wellbore systems may be developed where the database/library comprises details of the wellbore system, properties of the resonant effect, operating parameters and/or borehole parameters at or before the occurrence of the resonant effect and/or the like. The database/library may serve as a knowledge store to determine dominant resonance of a wellbore systems and properties, such as resonance period, of the dominant resonance of the wellbore system.

The period of the lowest frequency resonance of the dominant resonance for the wellbore system may be calculated to sufficient accuracy theoretically. Alternatively, by making measurements of the wellbore system and using methods such as Fourier transforms, Hilbert-Huang transforms, or cross-correlation, the period of the resonance may be determined. If the system is changing over time (for instance the drillstring being lengthened in the case of the rotating drillstring), then the period can be recalculated or re-measured when the system has changed. The change in period for the changing wellbore system may be estimated.

In step 30, a change profile for the change in level in operation of the system is devised. For example, for a change in speed in rotation of a drillstring in a rotary drilling system, a simple ramp up in speed may be devised to change the speed of rotation from a first rotation speed to a second rotation speed. In another example, a series of steps may be used to ramp the speed of rotation up to the desired rotation speed. In another example, the change profile for the drillstring, for operation of a pump, choke and/or the like may be sinusoidal in nature.

In most cases, simply using a linear ramp from one level to another will provide an adequate change profile. If for some reason such a profile is not possible or desirable (for instance if the gradient of the change must start at zero), then an alternative change profile can be used. To ensure that the change profile has frequencies which it does not excite, the gradient of the change profile is preferably symmetric about the mid-time of the change. Thus, if the change profile from level a to level b is given by f, where:

$$f(0)=a$$

$$f(T)=b$$

and the gradient of f is denoted by f′, then preferably for time t, where T/2<t<T, the gradient f′ is:

$$f'(t)=f'(T-t)$$

In step 40, a time-period over which the change in level of operation may be carried out in order to minimize excitation of the resonance is determined. This processing of the time-period for the level change may be performed using Fourier or other transforms and/or by other methods.

Although other methods are possible, one way to calculate the required time over which to make the change is to take the Fourier transform of the time derivative of the change profile.

The amplitude of the Fourier transform of a function is proportional to the amplitude of the Fourier transform of its time derivative, divided by the frequency. Thus if the Fourier transform of the time derivative of the change profile has a zero at a particular frequency, so does the time derivative of the change profile.

If the change profile derivative has the symmetry property described above, then it will have a zero for some frequency. Thus, if the change profile is a ramp (constant derivative), the Fourier transform of the derivative is zero for frequencies which are integers divided by the change time. Inverting, if the change time is an integer multiple of the resonance period, changing the set point will not excite the resonance.

If the change profile derivative is a sine wave over $\pi$ radians (180 degrees), then this will have a zero in the Fourier transform at integers plus a half, divided by the change time.

Thus, if the change time is an integer-plus-a-half times the resonance period, changing the set point will not excite the resonance.

In step 50, the change in level in operation of the system is performed using the change profile over the determined time period.

With the change profile chosen, and the change time calculation completed, the change may be made to the system. There will typically be many different times over which the change can be made, which will not excite the resonance frequency. For instance in the case of a ramp (constant change profile time derivative), the change time can be any integer multiple of the resonance. However, the time period may be chosen so that it is longer than the shortest time over which the change can physically be made, either by a human operator or a control system, but no longer than is necessary, i.e. the lowest multiple of the resonance time that can effectively be made by the system. However, a longer time (a greater multiple of the resonance period) may be used to ensure that the set change is fully and properly performed within the time period (there may be probabilities associated with the period for a state change that are accounted for in the period selected for the set change).

In a managed pressure drilling procedure, the resonance time for the annulus of the well being drilled during managed pressure drilling may be approximately determined by estimating/measuring an approximate average speed of sound, and assuming that the fundamental resonance of the drilling system/well/annulus is a half wavelength resonance, so the period is twice the length of the drilling system/well/annulus, multiplied by the inverse speed of sound.

The inverse speed of sound may be approximated as the square root of the average density of the fluid in the drilling system/well/annulus, times the average compliance of the fluid per unit volume (which is the inverse bulk modulus, for a stiff-walled annulus). The average density of the fluid in the drilling system/well/annulus may be determined by subtracting the pressure at the surface behind the choke from the bottomhole pressure, optionally making an adjustment for the frictional pressure drop, and then dividing by the vertical depth difference between the position of the two measurements and the acceleration due to gravity.

The average compliance of the fluid in the drilling system/well/annulus may be found by taking the total compliance of the fluid and dividing by the volume of the annulus. The total compliance may be determined by measurement, comparison with other similar systems, modelling, experimentation, theoretical calculation and/or the like. The total compliance may be determined using a method described in a co-pending patent application entitled "WELLBORE HYDRAULIC COMPLIANCE," filed as a U.S. Provisional Patent Application No. 61/880,074 on Sep. 19, 2013, which is incorporated by reference herein for all purposes.

By determining the resonance period, as described, for the managed pressure drilling system/process, this period can be used to determine a time period for level changes in the managed pressure drilling system that do not produce adverse resonance effects.

As described above, the change can be made by a control system that can automatically follow the desired change profile, but it can also be made by a human operator, attempting to keep to the required profile. Since the low-amplitude intervals around the zeros in the Fourier spectrum of the change profile derivative are generally quite wide, the change does not generally have to be made over exactly the right time for the benefits to be seen.

In this specification, the term wellbore system is used to describe a system that is operated in a borehole, such as a drilling system, an artificial lift system, a wireline system, a coiled tubing system, a downhole motor system, a casing system and/or the like. For purposes of determining the dominant resonance of the system, processing the change profile to produce a level change, determining a time period over which the level change should be performed and/or the like, the wellbore system may be considered to comprise the system itself as well as features of the borehole it is contained in and surrounding structure. For example, where the wellbore system is a drilling system for drilling the borehole, the frictional features between the drilling system and the borehole wall can be factors in determining the dominant resonance, the change profile, the time-period and/or the like. Similarly, pressures in the borehole, in the formation surrounding the borehole and/or the like may be factors in determining the dominant resonance, the change profile, the time-period and/or the like. Density of the drilling fluid/production fluids may be a factor in determination determining the dominant resonance, the change profile, the time-period and/or the like.

Figure 2B:
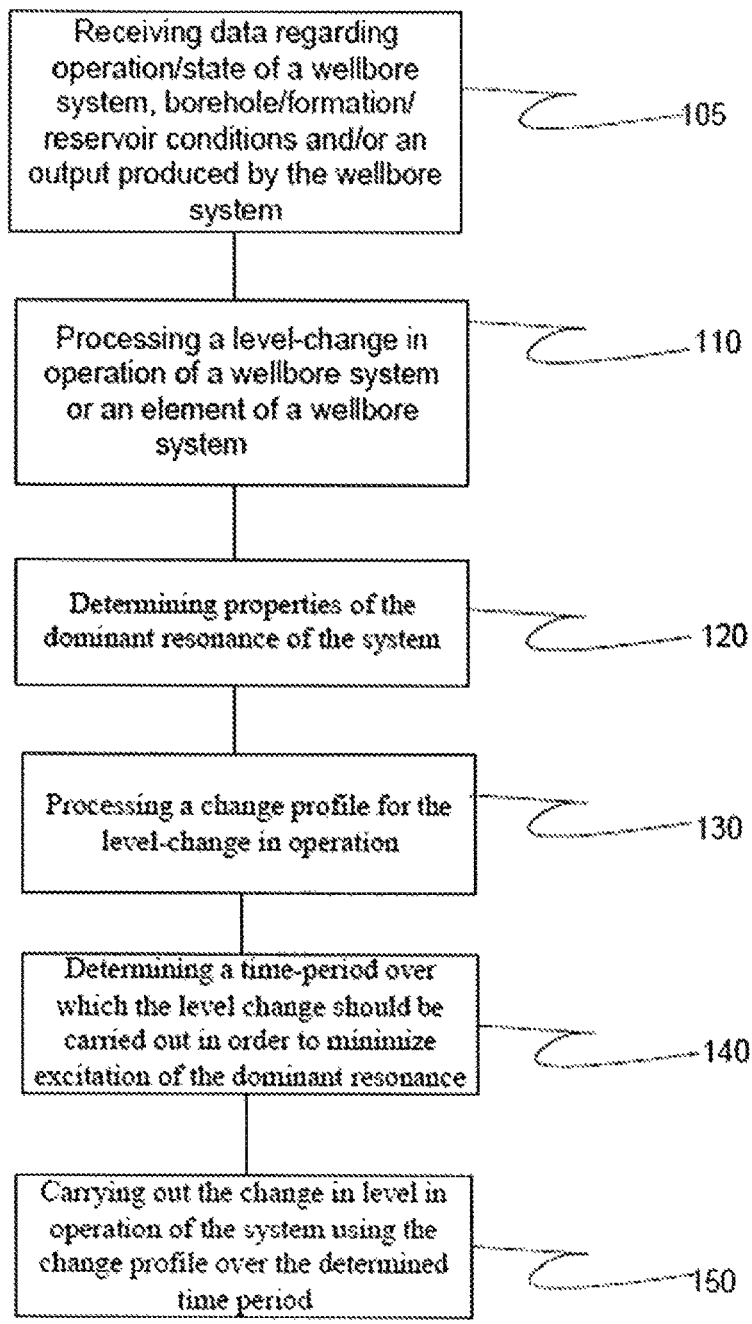
FIG. 2B is a flow-type illustration of the functioning of an automated wellbore system comprising resonance control.

FIG. 2B illustrates an automated wellbore system comprising resonance control in accordance with an embodiment of the present invention.

In step 105, data are received regarding operation/state of a wellbore system, borehole/formation/reservoir conditions and/or an output produced by the wellbore system. Merely by way of example, the wellbore system may be a drilling system, a managed pressure drilling system, an artificial lift system, a wireline system for operating a tool in a borehole, a wireline system, a downhole motor system, a reaming system, a casing system, a pumping system, a coiled tubing system and/or the like.

Input controls to the wellbore system and or sensors coupled with the wellbore system may be used to determine the state of the wellbore system and/or how the wellbore system is functioning. Similarly, sensors may be used to sense an output generated by the operation of the wellbore system, one or more conditions in the borehole, conditions surrounding the borehole and/or the like. Furthermore, models, look-ahead sensors and/or the like may be used to determine conditions to be encountered by the wellbore system as the borehole is extended.

Data regarding the wellbore system, the borehole, the formation surrounding the borehole and/or the like may be communicated to one or more processors.

In step 110, the processor may process the data to determine how the wellbore system should be operated in view of the communicated data. Merely by way of example, operation of a drilling system may controlled in view of the operating state of the drilling system, the conditions in the borehole, the conditions surrounding the wellbore and/or the like. The drilling system may be controlled to optimize speed of the drilling process, reduce wear of the drilling system, to control direction of drilling and/or the like. Furthermore, predictive models may be used, which predict results of changing operation of the drilling system, with the sensed data to determine how the drilling system should be operated to achieve a desired operating effect. While a drilling system has been used as an example, other wellbore systems or combinations of multiple wellbore systems may be controlled in the same manner in an automated wellbore system.

In step 110, the determination of how the wellbore system should be operated in view of the communicated data may comprise a determination of level change in the operation of the wellbore system.

In step 120, a dominant resonance of the wellbore system is processed. As noted above, the properties of the wellbore system, the borehole, the formation surrounding the borehole and/or the like may be used to process the dominant resonance. In an automated system, the dominant resonance may be repeatedly determined as the wellbore system is operated and fed to the processor as part of the data communicated to the processor in step 105. In such an automated system, the dominant resonance may be a factor in the processing of the level change.

In step 130, a change profile for the level change processed in step 110 may be processed. In an automated wellbore system, the change profile may be designed to produce the determined level change in a manner that optimizes the operation of the wellbore system. For example, the processor based on the communicated data may determine that a drilling system, pump and/or the like should be operated at a faster rate and that this increase in operating rate should, based upon the communicated data and/or predictive models or the like should be produced by changing operation of the wellbore system, speed of the drilling system, pump and/or the like, by increasing the speed according to a certain change profile. The change profile may be selected to avoid inputting frequencies that themselves may interact with the resonance properties of the wellbore system.

In step 140, a time period over which the level change should be performed in order to minimize excitation of the dominant resonance is processed. As noted above, the time period is determined from the period of the dominant resonance of the wellbore system. The wellbore system may be an automated system where the dominant resonance is repeatedly determined, in such systems, the time-period for level changes of the wellbore system may be repeatedly determined and fed to the processor in step 105. The dominant resonance and/or the time period for a level change may be used as a constraint that is used in processing how the automated wellbore system is to be operated to produce a desired/set operational result. More particularly, knowing the relationship between dominant resonance and the level-change time-period can provide for automatically operating the wellbore system to produce a desired operational result without producing adverse resonance effects.

In step 150, the change in level in operation of the system using the change profile over the determined time period is performed. Where the wellbore system is an automated system, the change may be performed automatically. An output may show the change in operation, the basis for the change in operation and/or the predicted outcome of the proposed change in operation of the system. Where the wellbore system is a semi-automated system, the change in level may be suggested to an operator of the system. An output/interface may show the proposed change in operation, the proposed change in operation and/or the predicted outcome of the proposed change in operation of the system.

Figure 3:
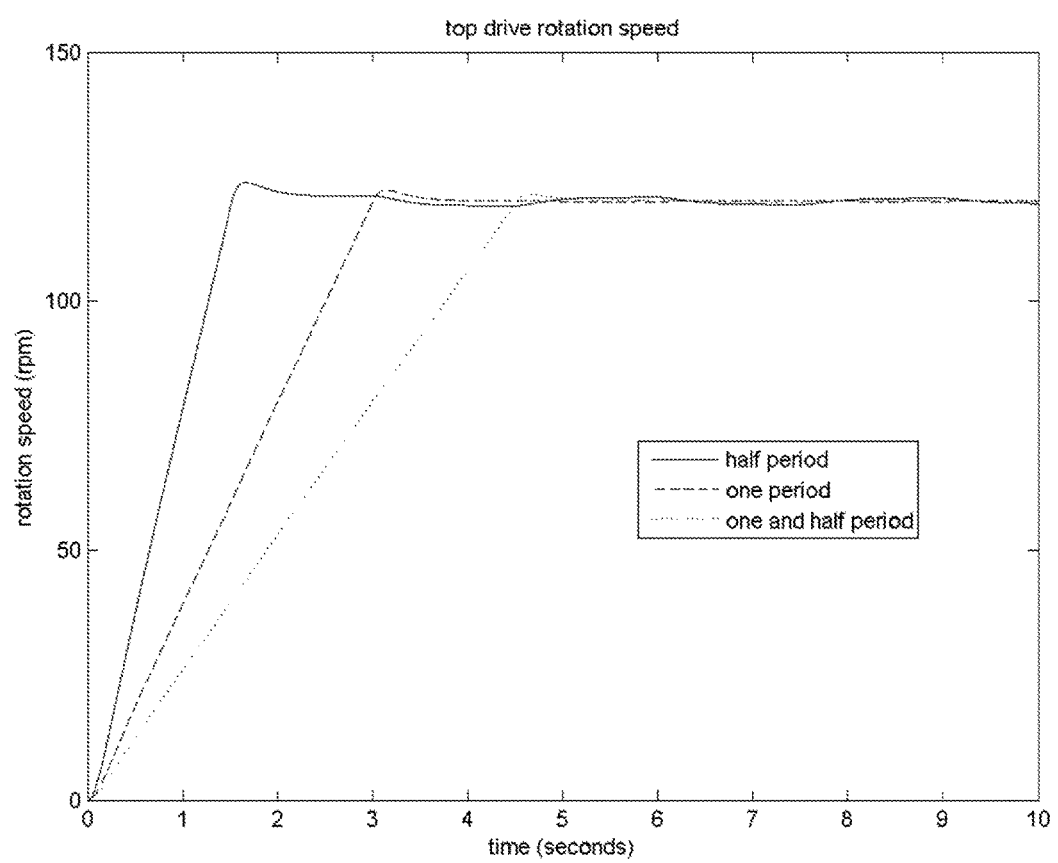
FIG. 3 shows plots of simulated rotation speed at the top of a drillstring against time.
Figure 4:
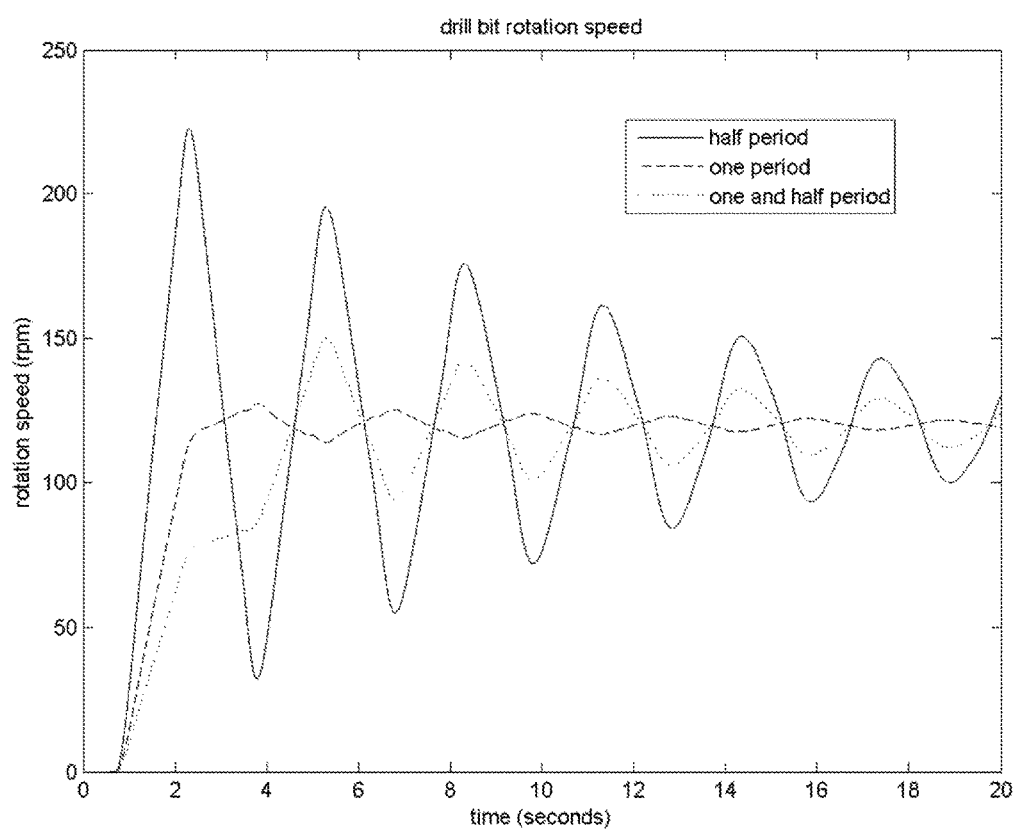
FIG. 4 shows corresponding plots of simulated rotation speed at the bottom of the drillstring against time.

FIGS. 3 and 4 show the theoretical effect on the rotation speed measured at the top and bottom of a drillstring in a vertical well when the rotation speed at surface is changed linearly from zero to 100 rpm in half the period of the resonance (solid line), the period of the resonance (dashed line) and one and a half times the period of the resonance (dotted line).

The drillstring in this simulation is not drilling, i.e. it is off bottom. In this example the resonant period is about 3 seconds, so the start-up times are 1.5, 3 and 4.5 seconds respectively.

FIG. 3 shows the rotation speed at the top-drive (the top of the drillstring), and FIG. 4 shows the rotation speed at the bit (the bottom of the drillstring), in a level change method. The reduction in the resonant oscillations from matching the change time to the resonance, is clearly shown in FIG. 4 where use of an integer multiple of the resonance of the drillstring, the dominant resonance, provides a stable level change rather than the oscillations produced by use of the half-integers.

Applications of the present invention include: changing the rotation speed in long slender structures such as drillstrings; changing the choke pressure at the top of an annulus;

changing the pump speed when pressurizing an annulus changing the speed of a cable winch (such as for wireline logging); and/or the like.

Merely by way of example, an application of a method for level change in a wellbore system, a drillstring in a vertical borehole, is now described. The drillstring can be started from rest, rotation of the drillstring initiated from rest, without significant post-start up rotational oscillations if the rotation speed at surface is taken linearly to the desired rotation speed over a time equal to an integer number of periods of the fundamental rotational resonance of the drillstring.

Figure 5:
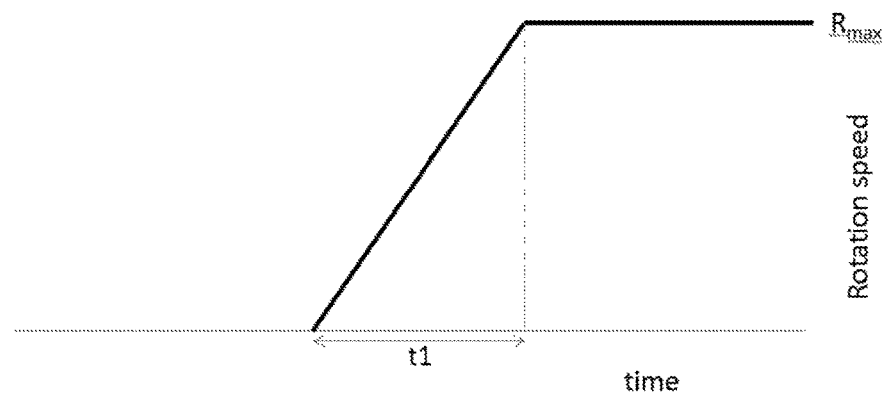
FIG. 5 shows a simple linear rise change profile.

This start up without resonance effect is shown in FIG. 5. The time interval t1 is an integer number of periods of the fundamental resonance of the system, or a time close to this.

The period of the fundamental resonance can be directly measured, by looking at the spectrum or time-series of torque or rotation speed, measured either at surface or downhole, or it can be calculated using elastic wave theory.

In many applications, such as that described above, a change profile which is a simple ramp over an integral number of resonant periods provides good resonance suppression.

In other applications, particularly those involving friction, better performance can be obtained with a change profile, which while dependent on the resonant period, is more complicated than a simple ramp.

Figure 6:
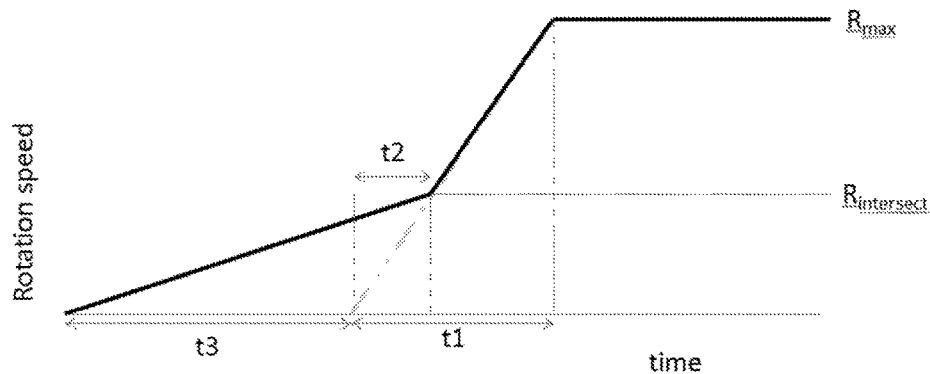
FIG. 6 shows a change profile having a first linear rate and a second linear rate.

An example of this is initiating rotation in a deviated well, where there is significant frictional interaction between the drillstring and the wellbore. In this case, a two stage ramp may be desirable, where the rotation speed rises first at one linear rate, and then at a second linear rate until the desired rotation speed is reached. The second linear rate is the same rate as when no friction is present, and thus is determined by the resonant period of the system. This change profile is illustrated in FIG. 6.

The time t2 depends only on the drillstring geometry and composition, and not on the friction. If no friction is present, and the drillstring rotation follows the path shown in FIG. 5, then there is a lag between the drillstring turning at the surface, and the bit starting to turn. The time t2 is twice this lag time.

The time t3 depends on the amount of friction that is present, and its distribution in the well. When the drillstring is rotating steadily off-bottom at speed $R_{max}$, due to the additional torque required to overcome friction, the top of the drillstring will have rotated through an angle which exceeds the angle rotated by the bottom of the drillstring (the bit).

This total angle depends on the torque required to overcome friction, and on the rotational compliance of the drillstring (the more compliant the drillstring, the greater the angle). Let this total angle be $\Theta$. The additional time t3 is proportional to $\Theta$ and is:

$$\frac{2\Theta}{R_{intersect}}$$

where $R_{intersect}$ is given by:

$$R_{intersect} = \frac{t2}{t1} R_{max}$$

Thus, the faster the desired final drillstring rotation speed, the shorter the additional time t3.

The time t1 is as described above when starting up a rotation in a vertical well. The other two required quantities, $\Theta$ and the lag time, would normally be estimated using calculation calibrated by observation, although they could be measured.

$\Theta$ can be calculated by combining the torque distribution along the drillstring, with an elastic model of the drillstring, ensuring that the total torque matches that observed in reality, or it can be calculated using an elastic wave theory or similar simulation.

Figure 7:
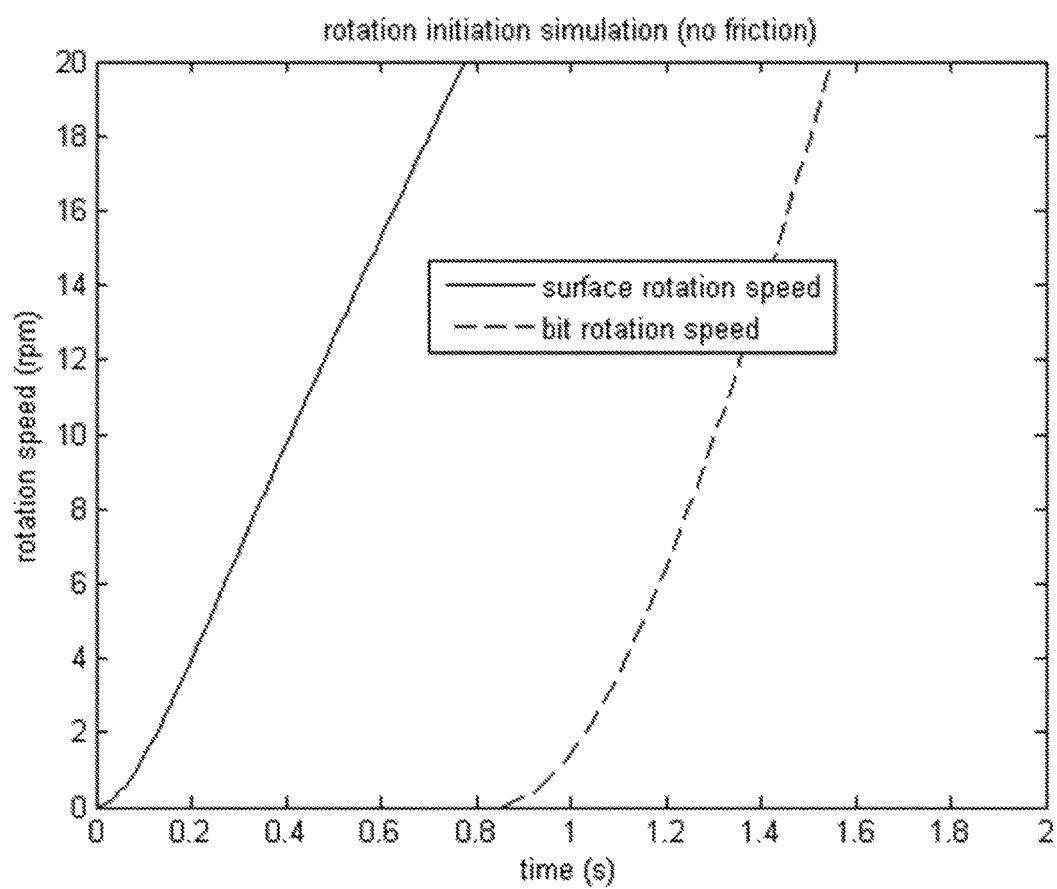
FIG. 7 shows a simulation of surface and bit rotation speeds for a 2400 m drillstring being started to reach 120 rpm in 4.6 s.

The lag time can be calculated using elastic wave theory or other simulation, ensuring that in the simulation the fundamental drillstring rotational resonance time matches that observed in reality. Such a simulation is shown in FIG. 7, where a 2400 m drillstring is being started to reach 120 rpm in 4.6 s. The lag time is 0.85 s, and thus t2 is 1.7 s.

Slopes and times do not have to be exactly those described, as good performance can be obtained with quantities that are close, nor does the rise profile have to be exactly linear. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

Numbered Clauses Relating to the Invention

Clause 1. A method for changing a set point of a system in a borehole according to any of the methods described herein.

Clause 2. A system for changing a set point of a system in a borehole according to any of the systems described herein.

Clause 3. A method for changing a set point of a system in a borehole, comprising:
  determining a dominant resonance of the system;
  processing a change profile for the set point change;
  determining a time period for the set point change to minimize excitation of the dominant resonance; and
  performing the set point change according to the change profile and the time period.

Clause 4. The method of clause 3, wherein the time period for a linear change profile comprises an integer multiple of a period of the dominant resonant frequency.

Clause 5. The method of clause 3, wherein the time period for a change profile comprising a half-period of a sine-wave comprises an integer plus a half multiple of the resonance period.

Clause 6. The method of clause 3, wherein the system comprises an automated system and the time period is used to control operation of the system.

Clause 7. A system for changing a set point of a system in a borehole, comprising:
  one or more sensors to sense properties of the system and/or the borehole; and
  a processor configured to:
    process a dominant resonance of the system;

process a change profile for the set point change; and
determine a time period for the set point change to minimize excitation of the dominant resonance.

Clause 8. The system of clause 7, further comprising:
a controller configured to control the system to perform the set point change according to the change profile and the time period.

Clause 9. The system of clause 7, wherein the processor comprises a downhole processor, a surface processor or a combination of a downhole and a surface processor.

The invention claimed is:

1. A method for changing a set point of a system in a borehole, comprising:
   determining the period of a dominant resonance of the system;
   processing a change profile for the set point change;
   determining a time period for the set point change based on the period of the dominant resonance in order to minimize excitation of the dominant resonance; and
   performing the set point change according to the change profile and the time period.

2. The method of claim 1, wherein the time period comprises a multiple of the period of the dominant resonance.

3. The method of claim 2, wherein the change profile comprises a linear change profile, and the time period is an integer multiple of the period of the dominant resonance.

4. The method of claim 2, wherein the time derivative of the change profile has a half-period of a sine-wave, and the time period is an integer-plus-a-half multiple of the period of the dominant resonance.

5. The method of claim 1, wherein the change profile is symmetric about the mid-time of the change.

6. The method of claim 1, wherein the determination of the time period for the set point change is performed by taking the Fourier transform of the time derivative of the change profile.

7. The method of claim 1, wherein the borehole system comprises a drillstring.

8. The method of claim 1, wherein the borehole system comprises a wireline.

9. The method of claim 1, wherein the borehole system comprises an electro-submersible pump.

10. A control system for changing a set point of a system in a borehole, comprising:
    a computer processor configured to:
       determine a period of a dominant resonance of the system;
       process a change profile for a set point change from sensed properties; and
       determine a time period for the set point change based on the period of the dominant resonance in order to minimize excitation of the dominant resonance; and
    a controller configured to control the system to perform the set point change according to the change profile and the time period.

11. The control system of claim 10, further comprising one or more sensors to sense properties of the system and/or the borehole, the determination of the period of the dominant resonance of the system and/or the processing of the change profile being based on the sensed properties.

12. A rig or a tool having the control system of claim 11.

13. The control system of claim 10, wherein the system comprises a managed pressure drilling system.

14. The control system of claim 10, wherein the system comprises a drilling system.

15. An automated system for operating one or more systems in a borehole, wherein the automated system comprises the control system of claim 10.

* * * * *